Nov. 9, 1943.                R. ANNEN                2,333,970
                            BALL BEARING
                       Filed Jan. 9, 1942

Inventor
R. Annen
By Blackett Downing Reibold
         Attys.

Patented Nov. 9, 1943

2,333,970

UNITED STATES PATENT OFFICE 2,333,970

BALL BEARING

Robert Annen, Bienne, Switzerland, assignor to Roulements a Billes Miniatures S. A., Bienne, Switzerland, a joint-stock company of Switzerland Application January 9, 1942, Serial No. 426,238
In Switzerland November 11, 1940

7 Claims. (Cl. 308—194)

The object of the present invention is a ball bearing preferably used in gyroscopes and other apparatus of this type. This ball bearing allows of the gimbal mounting, which has hitherto been necessary in instruments of this kind, to be omitted.

By means of the ball bearing according to the invention certain characteristic faults of self-aligning ball-bearings are avoided. In these latter every change in the orientation of the axis of the bearing with regard to the axis of the support of this bearing produces a sliding of the balls. It is understood that the friction resulting from this sliding injures the exactness of the observations made with an apparatus provided with this ball bearing.

The ball bearing according to the invention allows of great variations in the direction of the axle of the ball bearing relatively to its support, without any sliding of the balls carrying this axle.

It is characterised in that it comprises at least two concentric series of balls, the raceways of the outer series being spheres with a common centre.

The accompanying drawing represents, by way of example, three embodiments of the ball bearing according to the invention.

Figure 1:
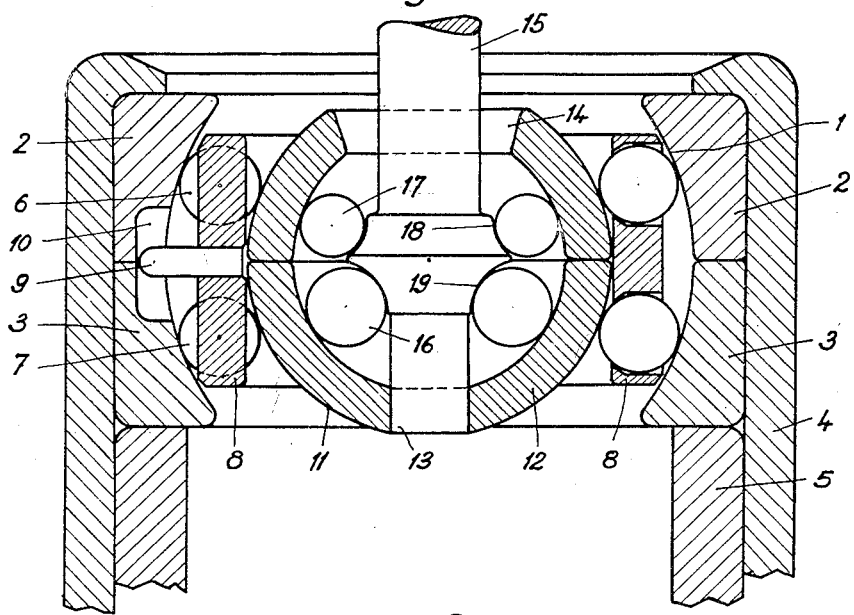
Fig. 1 is an axial section of a bearing with two concentric series, each with two rows of balls.

Referring to Fig. 1, the outer raceway 1 of the represented bearing is spherical and provided on the rings 2 and 3 held in the support 4 by a tube 5. These two rings bear against each other, but a compressible element might also be inserted between them, allowing of the play of the ball bearing to be adjusted. Inside this spherical raceway two rows of balls 6 and 7, forming the outer series of balls, are provided. As usual, they are held in a cage 8 which, in the represented example, is equipped with a pin 9 entering a recess 10 on the rings 2 and 3 and serving the purpose of preventing the cage 8 from rotating.

The inner raceway of the outer series of balls is constituted by the outer surface 11 of a track member 12 having, in this example, the form of a hollow ball and being pierced through by two holes 13 and 14 lying diametrically opposite each other. Through these holes passes the axle 15 supported by the ball bearing.

In the interior of this track member 12 the second and inner series of balls 16, 17 rolls, being supported, on the one hand, on the inner surface of the member 12 and, on the other hand, on the raceways 18 and 19 provided on a collar of the axle 15. In the way it is mounted, this latter, on carrying out oscillating movements, takes the member 12 along with it. In this case, the same rolls on the outer series of balls 6, 7. By this disposition any cause for the different series of balls to slide on their raceways is eliminated.

In this first example the outer and inner raceways of the series of balls 6, 7 are concentric spheres. This bearing may suffer an axial as well as a radial load without its operating conditions being modified.

Figure 2:
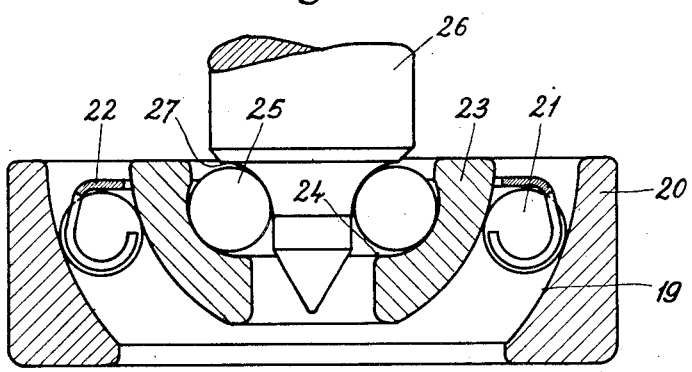
Fig. 2 is an axial section of another bearing with two concentric series of balls, each series having a single row of balls.

Referring to Fig. 2 the outer spherical raceway 19 is made on a ring 20. It cooperates with a series of balls forming but one row whose balls are separated from one another by a cage 22. The track member is here formed as a calotte 23, its outer surfaces serving as an inner raceway for the ball series 21 and having the same centre as the raceway 19. On the interior of this calotte is provided an outer raceway 24 for the inner ball series 25 consisting of but one row. The axle 26 bears with its end on the inner series of balls and has at this place a groove 27 whose section has a radius greater than that of the balls. This embodiment is exclusively a thrust bearing.

Figure 3:
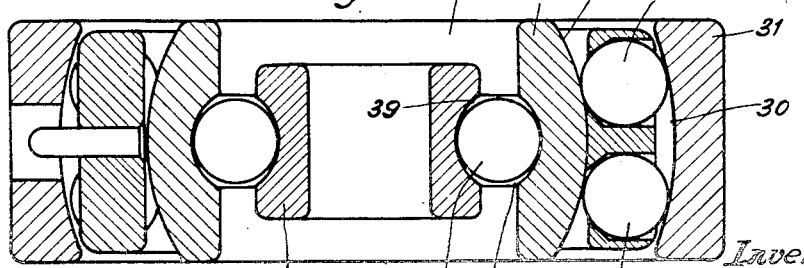
Fig. 3 is an axial section of a bearing whose outer series consists of two rows and whose inner series has a single row of balls.

Referring to Fig. 3 the outer raceway 30 is provided on the interior of a ring made in one piece 31 and is spherical as in the preceding examples. The track member 32, includes the inner raceway 33 for the series of balls 34, 35 which is arranged in two rows. This spherical surface 33 has the same centre as the raceway 30. The track member 32 has a cylindrical bore 36 whose axis goes through the centre of the sphere 33 and into whose wall a groove 37 is hollowed whereon the row of balls 38 rolls. These latter bear against a further groove 39 provided on the outer circumference of a hollow cylinder 40 receiving the non-represented axle which is to be supported by the bearing. This embodiment may suffer both axial and radial loads.

What I claim is:

1. In a device, a rotatable member and a ball-bearing comprising, an intermediate track member, an inner series of balls in contact with said intermediate track member and said rotatable member to allow this latter to rotate about an imaginary axis of rotation, the connection of said rotatable member and said intermediate track member being so as to force said intermediate track member to participate in the oscillatory motions of said rotatable member in a plane including said axis of rotation, said intermediate track member including a first spherical raceway, an outer track member having a second spherical raceway concentric to said first spherical raceway, and an outer series of balls in contact with said first and said second spherical raceway to allow said rotatable member to oscillate in a plane including said axis of rotation.

2. In a device, a rotatable member, and a ball-bearing comprising, a hollow ball with a wall of constant width and with two holes diametrically opposite each other to make room for said rotatable member, an inner series of balls in contact with said hollow ball and said rotatable member to allow this latter to rotate about an imaginary axis of rotation, the connection of said rotatable member and said hollow ball being so as to force said hollow ball to participate in the oscillatory motions of said rotatable member in a plane including said axis of rotation, said hollow ball including a first spherical raceway, an outer track member having a second spherical raceway concentric to said first spherical raceway, and an outer series of balls in contact with said first and said second spherical raceway to allow said rotatable member to oscillate in a plane including said axis of rotation.

3. In a device, a rotatable member, and a ball-bearing comprising, a hollow ball consisting of two calottes and having a wall of constant width and two holes diametrically opposite each other to make room for said rotatable member, an inner series of balls in contact with said hollow ball and said rotatable member to allow this latter to rotate about an imaginary axis of rotation, the connection of said rotatable member and said hollow ball being so as to force said hollow ball to participate in the oscillatory motions of said rotatable member in a plane including said axis of rotation, said hollow ball including a first spherical raceway, an outer track member having a second spherical raceway concentric to said first spherical raceway, and an outer series of balls in contact with said first and said second spherical raceway to allow said rotatable member to oscillate in a plane including said axis of rotation, the mutual position of said calottes being secured by the balls of said outer series.

4. In a device, a rotatable member, and a ball-bearing comprising a hollow spherical calotte, an inner series of balls in contact with said hollow calotte and said rotatable member to allow this latter to rotate about an imaginary axis of rotation, the connection of said rotatable member and said hollow calotte being so as to force said hollow calotte to participate in the oscillatory motions of said rotatable member in a plane including said axis of rotation, said hollow calotte including a first spherical raceway, an outer track member having a second spherical raceway concentric to said first spherical raceway, and an outer series of balls in contact with said first and said second spherical raceway to allow said rotatable member to oscillate in a plane including said axis of rotation.

5. In a device, a rotatable member, and a ball-bearing comprising an intermediate track member having a cylindrical hole, of first raceway hollowed out in the wall of said hole, an inner series of balls in contact with said first raceway and said rotatable member to allow this latter to rotate about an imaginary axis of rotation, the connection of said rotatable member and said intermediate track member being so as to force said intermediate track member to participate in the oscillatory motions of said rotatable member in a plane including said axis of rotation, said intermediate track member including a second spherical raceway, an outer track member having a third spherical raceway concentric to said second spherical raceway, and an outer series of balls in contact with said second and said third spherical raceway to allow said rotatable member to oscillate in a plane including said axis of rotation.

6. In a device, a rotatable member, and a ball-bearing comprising, an intermediate track member, an inner series of balls in contact with said intermediate track member and said rotatable member to allow this latter to rotate about an imaginary axis of rotation, the connection of said rotatable member and said intermediate track member being so as to force said intermediate track member to participate in the oscillatory motions of said rotatable member, said intermediate track member including a first spherical raceway, an outer track member having a second spherical raceway concentric to said first spherical raceway, an outer series of balls in contact with said first and said second spherical raceway to allow said rotatable member to oscillate in a plane including said axis of rotation, a ball cage separating the balls of the outer series from one another, and a pin adapted to lock said ball cage.

7. In a device, a vertically arranged rotatable member, and a ball-bearing comprising, a hollow ball consisting of two calottes and having a wall of constant width and two holes diametrically opposite each other to make room for said rotatable member, an inner series of balls in contact with said hollow ball and said rotatable member to allow this latter to rotate about an imaginary axis of rotation, the connection of said rotatable member and said hollow ball being so as to force said hollow ball to participate in the oscillatory motions of said rotatable member in a plane including said axis of rotation, said hollow ball including a first spherical raceway, an outer track member having a second spherical raceway concentric to said first spherical raceway, an outer series of balls in contact with said first and said second spherical raceway to allow said rotatable member to oscillate in a plane including said axis of rotation, the mutual position of said calottes being secured by the balls of said outer series, a cylindrical support having an internally flanged and open upper end in which the second spherical raceway is tightly fitted, and a supporting tube within the cylindrical support and abutting the lower edge of the second spherical raceway.

ROBERT ANNEN.